(12) United States Patent
Keech et al.

(10) Patent No.: US 7,014,270 B2
(45) Date of Patent: Mar. 21, 2006

(54) PIVOTAL TAIL EXTENSION

(75) Inventors: David K. Keech, Silverwater (AU); Alexander Hand, Glenore Grove (AU)

(73) Assignee: Keech Castings Australia Pty Limited, New South Wales (AU)

( * ) Notice: Subject to any disclaimer, the term of this patent is extended or adjusted under 35 U.S.C. 154(b) by 0 days.

(21) Appl. No.: 10/853,898

(22) Filed: May 24, 2004

(65) Prior Publication Data

US 2005/0088031 A1    Apr. 28, 2005

Related U.S. Application Data

(63) Continuation of application No. PCT/AU02/01575, filed on Nov. 22, 2002.

(30) Foreign Application Priority Data

Nov. 23, 2001    (AU) .................................... PR9029

(51) Int. Cl.
*B60P 1/04*        (2006.01)
(52) U.S. Cl. ................................. 298/17 SG
(58) Field of Classification Search .......... 298/17 SG, 298/23 MD, 23 A, 23 F, 23 D, 23 DF, 23 R; 296/183.2, 57.1
See application file for complete search history.

(56) References Cited

U.S. PATENT DOCUMENTS

| | | | | |
|---|---|---|---|---|
| 2,374,397 | A | * | 4/1945 | Wagner ...................... 298/8 R |
| 3,326,605 | A | * | 6/1967 | Steingas et al. ........... 298/17.7 |
| 3,625,566 | A | * | 12/1971 | Suuronen ................... 298/23 D |
| 3,730,591 | A | * | 5/1973 | Griffis ....................... 298/17.6 |
| 3,773,385 | A | * | 11/1973 | Sandberg ............... 298/23 MD |
| 3,977,718 | A | * | 8/1976 | Nordberg .................... 296/57.1 |
| 3,998,491 | A | * | 12/1976 | Diem .......................... 298/11 |
| 4,077,328 | A | | 3/1978 | Taylor |
| 5,176,486 | A | | 1/1993 | Park |

FOREIGN PATENT DOCUMENTS

| | | |
|---|---|---|
| AU | 59473/86 A1 | 1/1987 |
| CA | 2339312 A1 | 2/2000 |
| CH | 569608 A1 | 11/1975 |
| DE | 272440 A1 | 10/1989 |
| GB | 2341841 A1 | 3/2000 |
| SU | 1087380 A1 | 4/1984 |

OTHER PUBLICATIONS

International Search Report.

* cited by examiner

*Primary Examiner*—H. Gutman
(74) *Attorney, Agent, or Firm*—Darby & Darby

(57) ABSTRACT

A tail extension (1) adapted to be pivotally attached (2) to a load carrying container (3). Tail (1) pivots between a first position substantially outwards from a floor of the container, and a second position upwardly inclined relative to said floor. Tail (1) may be formed as one or a plurality of sections which move individually or cooperatively. Tail (1) may be pivotally connected (2) adjacent the floor of container (3) by a hinge allowing free movement and/or may be displaced by a drive means (e.g. hydraulic, mechanical, pneumatic). By tail (1) being able to pivot when contracting the ground, tail (1) and container (3) are not going to be subjected to undue forces which may damage tail (1) or container (3). When being transported, tail (1) acts as an extension to improve the load carrying capacity of the container by extending outwardly, or, can be displaced upwardly by a drive means to form a rear wall on the container.

14 Claims, 4 Drawing Sheets

PIVOTAL TAIL EXTENSION

CROSS REFERENCE TO RELATED APPLICATIONS

This application is a continuation of International patent application Ser. No. PCT/AU02/01575 filed Nov. 22, 2002, which claims the benefit of Australian patent application Serial No. PR 9029, filed Nov. 23, 2001, which are hereby incorporated by reference in their entirety. The International application was published in English on May 30, 2003 as WO 03/043850 A1 under PCT Article 21(2).

TECHNICAL FIELD

The present invention relates to an improved apparatus and method for minimizing damage caused to the tail extension of a load carrying vehicle. In particular, the present invention provides an improved apparatus and method for minimizing damage caused to the tail extension of a dump truck.

BACKGROUND ART

The reference to any prior art in this specification is not, and should not be taken as, an acknowledgement or any form of suggestion that that prior art forms part of the common general knowledge.

Tail extensions have been employed on the rear of load-carrying vehicles in order to enhance load retention and to reduce spillage of loads.

Traditional prior art techniques have tended to involve the highly labour-intensive and inefficient process of welding the tail-extension, typically consisting of a metal plate, to the load-carrying container of the vehicle. Thus, in order to disengage the tail extension, the reverse of the process is equally, if not more inconvenient and laborious to perform. This also makes it particularly difficult to conduct repairs or regular maintenance of such equipment where removal of the tail section is necessary.

Moreover, when traditional techniques have been used, and the main body of a dump truck is in a raised dumping position, horizontal loads tend to generate large movement forces that warp and rotate the tail extension from the main body resulting in permanent damage.

Accordingly there is a requirement for improvements in the current range of tail extensions for load-carrying vehicles.

SUMMARY OF THE INVENTION

The present invention seeks to provide a tail extension for a load carrying vehicle/container, in which the disadvantages of the prior art are sought to be overcome.

The present invention seeks to provide a tail extension for a load carrying vehicle/container which is adapted to undergo movement, such that it is not prone to be otherwise damaged.

In one broad form, the present invention provides a tail extension adapted to be pivotally attached to a load carrying container, wherein said tail pivots between a first position substantially outwards from a floor of said container, and a second position upwardly inclined relative to said floor.

Preferably, said tail is pivotally connected to said container by a hinge (allowing free movement of said tail).

Also preferably, said tail extension includes drive means to displace said tail relative to said floor of said container.

Alternatively, or in addition, said drive means includes any one or combination of hydraulic, mechanical, pneumatic or other drive means.

Preferably, said tail is detachable or otherwise removable from said container.

In a preferred form, said tail is formed in a plurality of separate sections capable of separate movement.

Also preferably, said tail is formed in a plurality of separate sections capable of simultaneous movement.

In a preferred form said drive means includes a hydraulic drive cylinder and associated piston arm, said piston arm being hingedly attached to a first end of an actuator arm and a second end of said actuator arm being hingedly attached to said tail, such that when said piston arm is extended from said cylinder said tail is displaced away from said floor, and, when said piston arm is contracted within said cylinder said tail is displaced towards alignment with said floor.

In a preferred form, said load carrying container is formed as a tiltable tray on a dump truck, tip truck or like vehicle.

In another preferred form, said load carrying container is formed as a dumpster container.

In a further broad form, the present invention provides a dump truck, tip truck or like vehicle having a tiltable load carrying container, said container having a tail member adapted to pivot between a first position substantially co-planar to a floor of said container, and a second position upwardly inclined relative to said floor.

Preferably, said tail is pivotally connected to said container via a hinge, such that, as said container is tilted towards a dumping position, when said tail abuts a substrate, said tail is pivotally displaced relative to said container.

Alternatively, or in addition, said vehicle further includes drive means to operatively displace said tail relative to said container.

In a preferred form, said tail is pivotally displaced either freely due to gravitational forces or the like and/or operatively by a drive means.

In another preferred form, in a transporting position, said drive means is operated to move said tail upwardly to form a tail wall on said container.

BRIEF DESCRIPTION OF FIGURES

The present invention will become better understood from the following detailed description of a preferred but non-limiting embodiment thereof, described in connection with the accompanying drawing(s), wherein.

MODES FOR CARRYING OUT THE INVENTION

Figure 1:
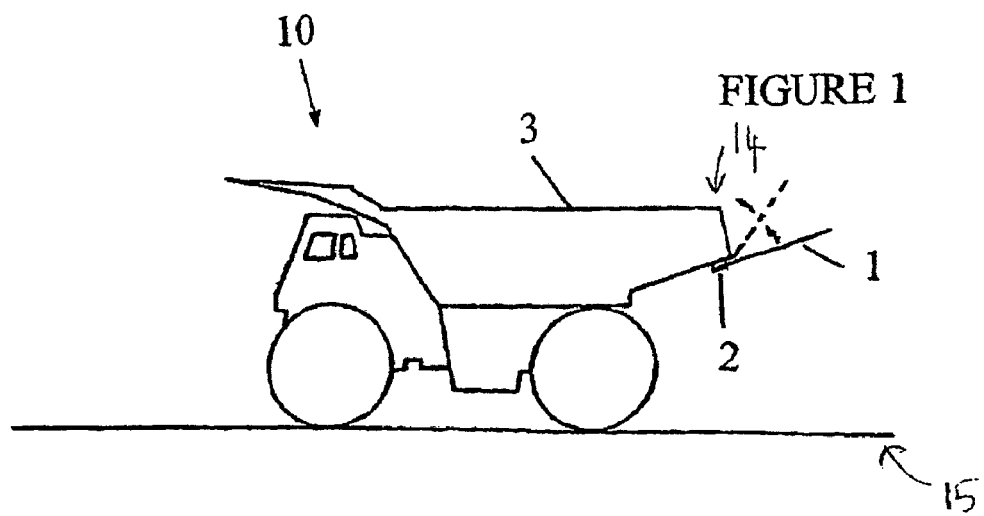
FIG. 1 shows a side-view of a first example of a pivotal tail extension attached to a dump truck, with the truck container in a lowered position.
Figure 2:
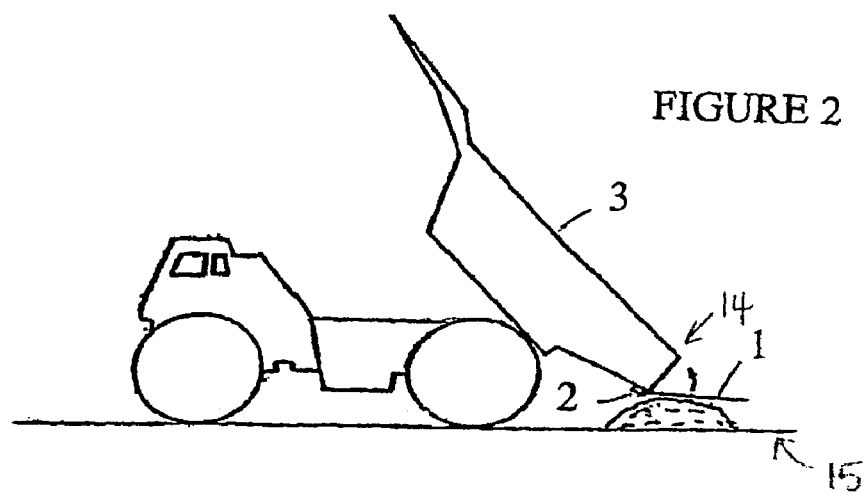
FIG. 2 shows a side-view of a first example of a pivotal tail extension attached to a dump truck, with the truck container in the raised dumping position.

FIG. 1 shows the present invention attached to a truck (10) wherein the extended tail section (1) is pivotally attached to the truck container (3). As shown in FIG. 2, the extended tail section pivots (in the direction shown by the arrows) when the container is in a dumping position.

Figure 3:
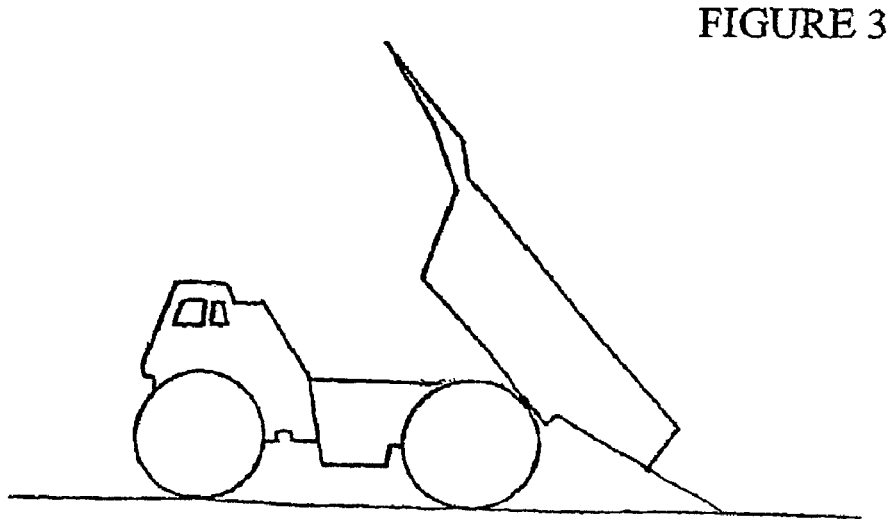
FIG. 3 shows a side-view of a traditional rigidly-mounted tail extension attached to a dump truck with the container in the raised dumping position.

FIG. 3 depicts a traditional prior art arrangement where the tail extension is rigidly mounted to the truck container (3) and is subject to damage as a result of its inability to pivot when the tail extension contacts the ground or substrate surface or other object, when in the dumping position.

Figure 4:
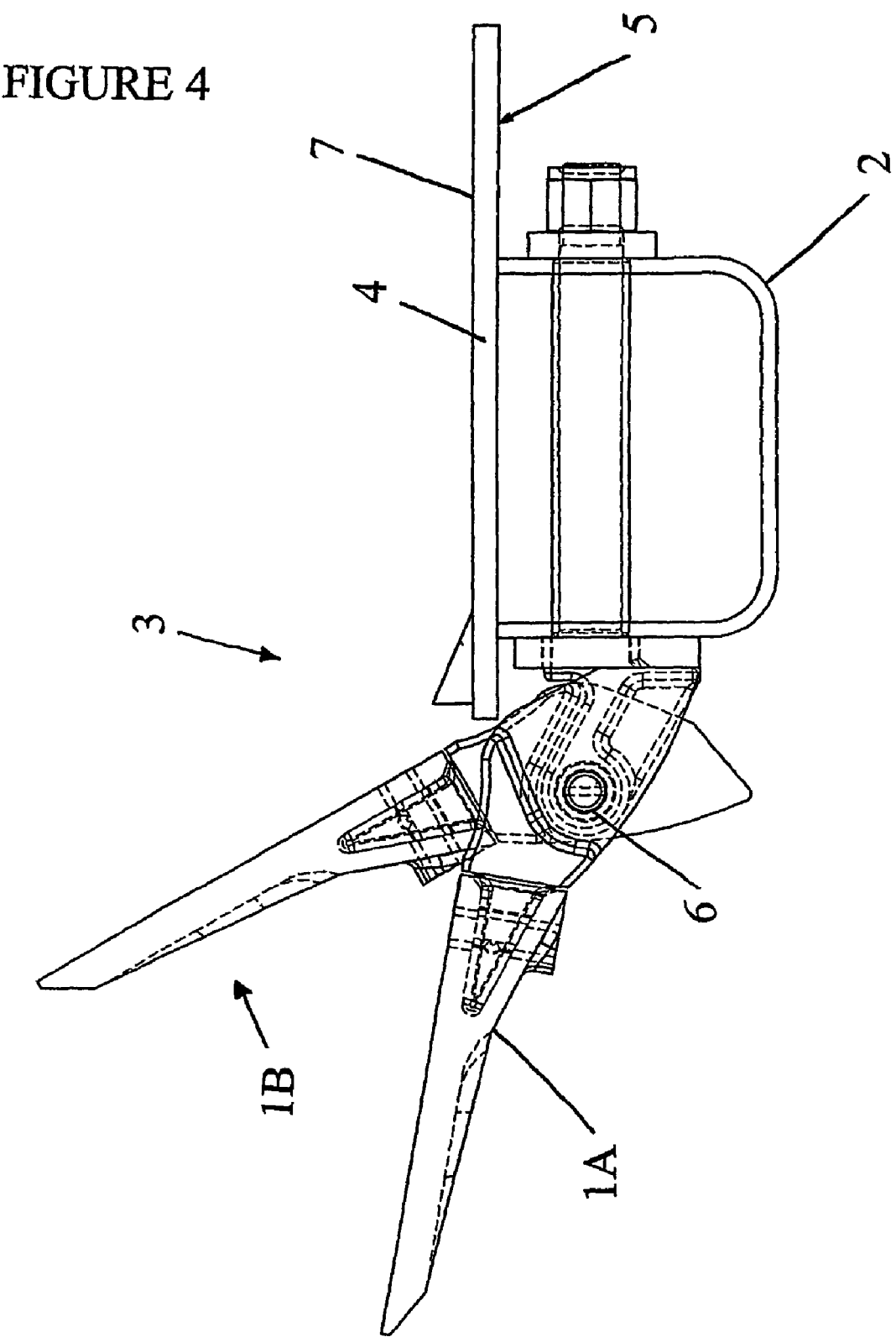
FIG. 4 shows a side-view of a first example of a pivotal tail extension attached to a dump truck wherein the pivotal tail section is shown in two possible positions.

FIG. 4 illustrates one example of the present invention including a tail section (1), a support section (2), a rear end of a truck container (3), the floor of the truck container (4) and a coupling means (6) to pivotally couple the tail section to the support section.

In the example shown, a plurality of tail sections (1) are used. The number of tail sections (1) may depend upon the parameters of the container (3) to which the invention will be applied, but should be easily selected by a person skilled in the art.

Figure 5:
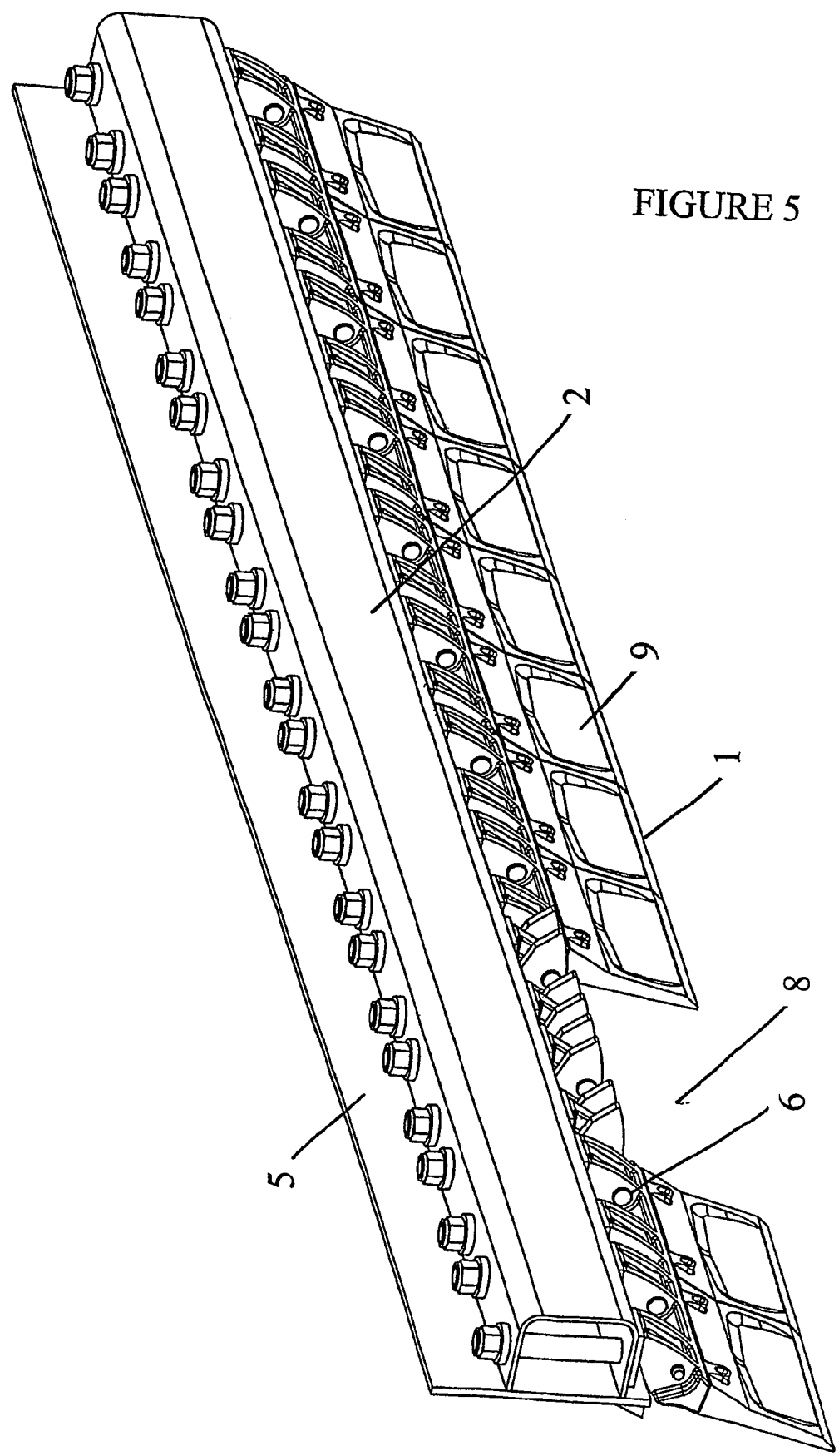
FIG. 5 is a perspective view of a first example of a pivotal tail extension including a plurality of tail sections, coupled to a U-shaped support section on the underside of the rear end of a dump truck container.

The tail sections (1) each have substantially the same dimensions and are each coupled to a single support section (2) by way of corresponding coupling means (6) as shown in FIG. 5. In operation, the tail sections (1) are displaced synchronously in relation to the support section (2) such that they will each be in substantially the same position at any given time.

Also in this example, the tail sections (1) are made of a rigid and lightweight metal alloy. Although FIG. 5 depicts the tail sections with apertures (9) in them to allow debris of certain dimensions to pass, it will be appreciated by persons skilled in the art that the tail sections (1) may not include such apertures (9). The tail sections may also be substantially flat plates.

FIGS. 4 and 5 reveal the support section (2) which in this example, consists of a single metal frame of U-shaped cross-section that is mounted to the underside (5) of the truck container floor (4) toward the rear end (14). In other examples, more than one support section (2) may be employed in the working of the invention.

The support section (2) has been welded to the underside (5) of the container floor however in other embodiments of the present invention any suitable mounting means known to persons skilled in the art may be employed. Also in another embodiment of the present invention, the support section (2) may be mounted to the upper-side (7) of the container floor (4). Either way, it will be appreciated that the tail extension or section (1) will pivot, from a position substantially adjacent to, but may be slightly underneath or above, the floor (4) of the container.

The support section (2) may be made from the same or a similar material to that of the tail sections (1). Persons skilled in the art will appreciate that any number of alternative materials may be suitable for this purpose.

Also in this example, as shown in FIG. 5, the support section (2) includes a plurality of coupling means (6) which correspond to each of the tail sections (1), and which enables coupling between the said tail sections (1) and the support section (2). Each of the coupling means (6) used in the present embodiment consists of a simple hinge arrangement, however any other suitable means of coupling commonly known to persons skilled in the art may be used to allows the tail sections (1) to be pivotally displaced relative to the support section. Each tail section (1) can be individually decoupled from the support section (2) to conveniently enable repair of a particular tail section (1). In FIG. 5, reference numeral (8) shows for instance the support section with two tail sections (1) decoupled.

During transportation, the tail sections (1) may be displaced to a first position as shown in FIG. 4. (1B), so that they substantially enclose the rear end (14) of the truck container (3) and prevent spillage. The tail sections (1) are fixably held in the first position by a displacement or drive means of any suitable kind commonly known to a person skilled in the art. When the load is to be dumped, the tail sections (1) may be pivotally displaced to a second position as shown in FIG. 4 (1A), wherein the load can unobstructively exit the container. The tail section (1) may optionally be disengaged from the displacement or drive means such that they can pivot freely. This ensures that if they contact the ground, or substrate surface or other object, they can freely pivot such that forces are not built up and prone to bend the container frame, the tail extension or section (1), to consequently cause damage.

Figure 6:
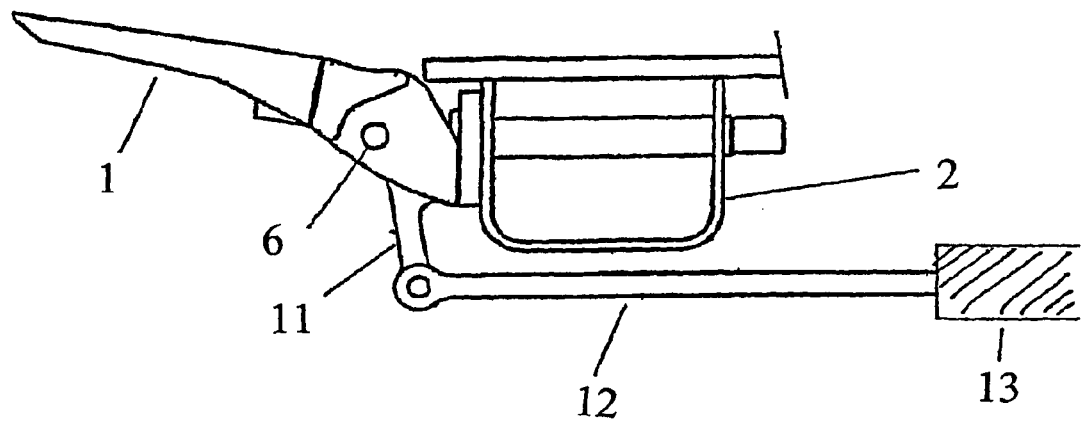
FIG. 6 shows a side-view of a second example of an improved pivotal tail extension in a first position attached to a support section, wherein the tail section is engaged to a hydraulic displacement means and the piston arm is extended; and, FIG. 7 shows a side-view of a second example of an improved pivotal tail extension in a second position attached to a support section, wherein the tail section is engaged to a hydraulic displacement means and the piston arm is retracted.
Figure 7:
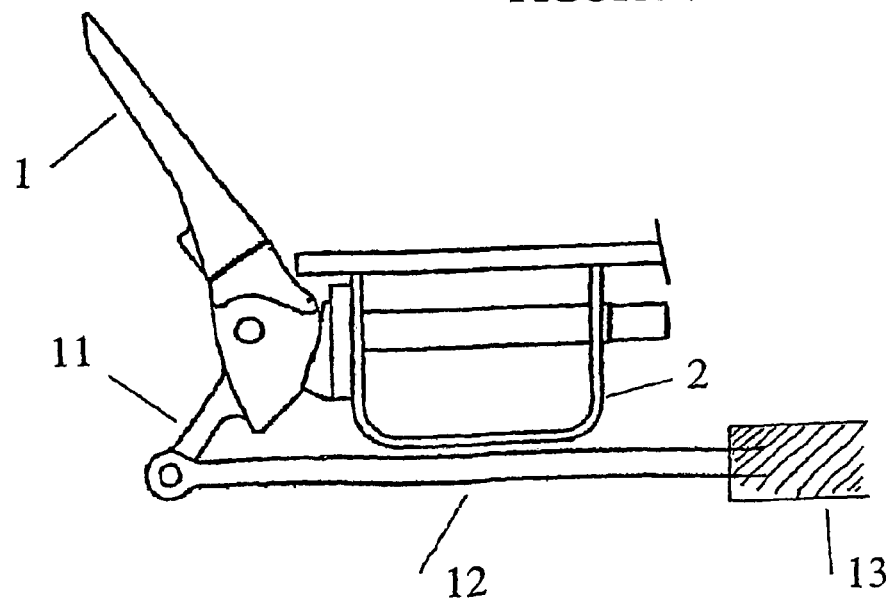

FIGS. 6 and 7 show an embodiment of the present invention in which the tail section is pivotally displaceable relative to the support means using a displacement means. The displacement means may include an actuator arm (11), a piston arm (12) and a hydraulic drive cylinder (13). In this example, a single tail section is coupled to the support section and a first end of the actuator arm is rigidly mounted to the tail section. A second end of the actuator arm is pivotally coupled to a first end of the piston arm by a hinge. A second end of the piston arm is slidingly engaged with the hydraulic drive cylinder such that when the piston arm is forcefully extended from the hydraulic cylinder, it causes the actuator arm to pivotally displace the tail section into a first position relative to the support section. Conversely, when the truck container is raised in the dumping position, load forces bear upon the tail section as the load is dumped causing the tail section to be pivotally displaced relative to the support section in a second position such that the actuator arm forces the piston arm back into the hydraulic cylinder. It should be appreciated by persons skilled in the art that any other suitable hydraulic, pneumatic or mechanical drive arrangement may be used to pivotally displace the tail, either in a single piece or in a plurality of sections of the present invention.

Thus, there has been provided in accordance with the present invention, a method and system which satisfies the advantages set forth above and overcome the problems hereinbefore discussed.

It will therefore be appreciated that the present invention provides a tail section (1) adapted to be pivotally attached (2) to a load carrying container (3), wherein said tail section (1) pivots between a first position substantially outwards from a floor of said container, and a second position upwardly inclined relative to said floor. The tail section (1) may be formed in a single section or a plurality of sections which move individually or cooperatively. The tail section (1) may be pivotally connected (2) adjacent the floor of the container (3) by a hinge allowing free movement and/or may be displaced by a drive means (e.g. hydraulic, mechanical, pneumatic). By the tail section (1) being able to pivot, if it comes into contact with the ground or substantial surface (15), the tail section (1) and the container (3) are not going to be subjected to undue forces which may damage the tail section (1) or container (3). When being transported, the tail section (1) acts as an extension to improve the load carrying capacity of the container by extending outwardly, or, it can be displaced upwardly by a drive means to form a rear wall on the container.

Those skilled in the art will appreciate that the invention described herein is susceptible to variations and modifications other than those specifically described without departing from the scope of the invention. It is to be understood that the invention includes all such variations and modifications. The invention also includes all of the steps, features, compositions and compounds referred or indicated in the specification, individually or collectively, and any and all combinations of any two or more of said steps or features.

INDEX

1. Tail section
2. Support section
3. Container
4. Floor of truck container
5. Underside of truck container
6. Coupling means
7. Upper-side of container floor
8. Support section with two tail sections decoupled
9. Aperture in tail section
10. Truck
11. Actuator arm
12. Piston arm
13. Hydraulic drive cylinder
14. Rear end of truck container
15. Substrate

What is claimed is:

1. A tail extension including a plurality of tail sections adapted to be pivotally attached to a load carrying container, whereby said tail sections pivot around a common axis between a first position whereby the tail sections are arranged substantially outwardly from a floor of said container and a second position whereby the tail sections are arranged substantially upwardly inclined relative to said floor.

2. A tail extension as claimed in claim 1, wherein said tail sections are pivotally connected to said container by a hinge.

3. A tail extension as claimed in claim 1 or 2, including drive means to displace said tail sections relative to said floor of said container.

4. A tail extension as claimed in claim 1, wherein said tail sections are detachable or otherwise removable from said container.

5. A tail extension as claimed in claim 1, wherein said tail sections are capable of separate movement.

6. A tail extension as claimed in claim 1, wherein said tail sections are capable of simultaneous movement.

7. A tail extension as claimed in claim 3, wherein said drive means includes a hydraulic drive cylinder and associated piston arm, said piston arm being hingedly attached to a first end of an actuator arm and a second end of said actuator arm being hingedly attached to said tail extension, such that when said piston arm is extended from said cylinder, said tail sections are displaced into a substantially inclined position relative to said floor, and, when said piston arm is contracted within said cylinder, said tail sections are displaced towards alignment with said floor.

8. A tail extension as claimed in claim 1, wherein said load carrying container is formed as a tiltable tray on a dump truck or tip truck.

9. A tail extension as claimed in claim 1, wherein said load carrying container is formed as a dumpster container.

10. A vehicle having a tiltable load carrying container, said container having a tail member including a plurality of tail sections, adapted to pivot between a first position substantially co-planar to a floor of said container, and a second position upwardly inclined relative to said floor.

11. A vehicle as claimed in claim 10, wherein each said tail section is pivotally connected to said container via a hinge, such that, as said container is tilted towards a dumping position, when said tail section abuts a substrate, each said tail section is pivotally displaced relative to said container.

12. A vehicle as claimed in claim 10, further including drive means to operatively displace each said tail member relative to said container.

13. A vehicle as claimed in claim 10, wherein each said tail section is pivotally displaced either freely due to gravitational forces or operatively by a drive means.

14. A vehicle as claimed in any one of claim 12 or 13, wherein in a transporting position, said drive means is operated to move each said tail member upwardly to form a tail wall on said container.

* * * * *